United States Patent
Murugappan

(10) Patent No.: US 8,903,837 B2
(45) Date of Patent: Dec. 2, 2014

(54) INCORPORATING GEOGRAPHICAL LOCATIONS IN A SEARCH PROCESS

(75) Inventor: Anand Murugappan, Sunnyvale, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 738 days.

(21) Appl. No.: 12/759,453

(22) Filed: Apr. 13, 2010

(65) Prior Publication Data

US 2011/0252064 A1    Oct. 13, 2011

(51) Int. Cl.
     *G06F 17/30*        (2006.01)

(52) U.S. Cl.
     CPC ................... *G06F 17/30041* (2013.01)
     USPC .......................................................... 707/758

(58) Field of Classification Search
     USPC ........ 701/33.9, 32.6; 707/758, 785, 770, 791, 707/768, 769, 756.748, 749
     See application file for complete search history.

(56) References Cited

U.S. PATENT DOCUMENTS

| | | | | |
|---|---|---|---|---|
| 7,693,683 | B2* | 4/2010 | Ihara | 702/179 |
| 7,805,450 | B2* | 9/2010 | Delli Santi et al. | 707/754 |
| 7,974,878 | B1* | 7/2011 | Chu et al. | 705/14.69 |
| 8,015,183 | B2* | 9/2011 | Frank | 707/724 |
| 2004/0019601 | A1* | 1/2004 | Gates | 707/102 |
| 2004/0193615 | A1* | 9/2004 | Kothuri | 707/100 |
| 2007/0047820 | A1* | 3/2007 | Vaatveit | 382/224 |
| 2007/0146374 | A1* | 6/2007 | Riise et al. | 345/505 |
| 2008/0010273 | A1* | 1/2008 | Frank | 707/5 |
| 2008/0010605 | A1* | 1/2008 | Frank | 715/765 |
| 2008/0243821 | A1* | 10/2008 | Delli Santi et al. | 707/5 |
| 2008/0243824 | A1* | 10/2008 | Riise et al. | 707/5 |

OTHER PUBLICATIONS

"Search Matters Talking Points," Yahoo! Inc. Technical Paper, Oct. 2009.
"The Science of Geolocation," Quova, Inc., http://www.quova.com/Technology/thescienceofgeolocation.aspx, accessed Apr. 9, 2010, 2009
U.S. Appl. No. 12/694,515 entitled Personalize Search Results for Search Queries with General Implicit Local Intent:, Jan. 27, 2010.

* cited by examiner

*Primary Examiner* — Ajay Bhatia
*Assistant Examiner* — Fatima Mina
(74) *Attorney, Agent, or Firm* — Berkeley Law & Technology Group LLP

(57) ABSTRACT

In one embodiment, accessing a search query and a document identified in response to the search query; extracting a first geographical location from the search query or from information associated with a user issuing the search query or a device used by the user to issue the search query; determining a first minimum bounding region enclosing the first geographical location; computing a threshold for the first geographical location; extracting one or more second geographical locations from the document; for one of the second geographical locations, determining a second minimum bounding region enclosing the one second geographical location; computing a distance between the first minimum bounding region and the second minimum bounding region; and if the distance is greater than the threshold, then discarding the document by not including the document in a search result identified in response to the search query.

31 Claims, 7 Drawing Sheets

INCORPORATING GEOGRAPHICAL LOCATIONS IN A SEARCH PROCESS

TECHNICAL FIELD

The present disclosure generally relates to improving the quality of search results identified in response to search queries and more specifically relates to taking geographical locations into consideration when identifying search results in response to search queries that have locations of interest.

BACKGROUND

The Internet provides a vast amount of information. The individual pieces of information are often referred to as "network resources" or "network contents" and may have various formats, such as, for example and without limitation, texts, audios, videos, images, web pages, documents, executables, etc. The network resources are stored at many different sites, such as on computers and servers, in databases, etc., around the world. These different sites are communicatively linked to the Internet through various network infrastructures. Any person may access the publicly available network resources via a suitable network device (e.g., a computer, a smart mobile telephone, etc.) connected to the Internet.

However, due to the sheer amount of information available on the Internet, it is impractical as well as impossible for a person (e.g., a network user) to manually search throughout the Internet for specific pieces of information. Instead, most network users rely on different types of computer-implemented tools to help them locate the desired network resources. One of the most commonly and widely used computer-implemented tools is a search engine, such as the search engines provided by Microsoft® Inc., Yahoo!® Inc., and Google® Inc. To search for information relating to a specific subject matter or topic on the Internet, a network user typically provides a short phrase or a few keywords describing the subject matter, often referred to as a "search query" or simply a "query", to a search engine. The search engine conducts a search based on the search query using various search algorithms and generates a search result that identifies network resources that are most likely to be related to the search query. The network resources are presented to the network user, often in the form of a list of links, each link being associated with a different network document (e.g., a web page) that contains some of the identified network resources. In particular embodiments, each link is in the form of a Uniform Resource Locator (URL) that specifies where the corresponding network document is located and the mechanism for retrieving it. The network user is then able to click on the URL links to view the specific network resources contained in the corresponding document as he wishes.

Sophisticated search engines implement many other functionalities in addition to merely identifying the network resources as a part of the search process. For example, a search engine usually ranks the identified network resources according to their relative degrees of relevance with respect to the search query, such that the network resources that are relatively more relevant to the search query are ranked higher and consequently are presented to the network user before the network resources that are relatively less relevant to the search query. The search engine may also provide a short summary of each of the identified network resources.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of search results identified in response to search queries and more specifically relates to taking geographical locations into consideration when identifying search results in response to search queries that have locations of interest.

In particular embodiments, accessing a search query and a document identified in response to the search query; extracting a first geographical location from the search query or from information associated with a user issuing the search query or a device used by the user to issue the search query; determining a first minimum bounding region enclosing the first geographical location; computing a threshold for the first geographical location; extracting one or more second geographical locations from the document; for one of the second geographical locations, determining a second minimum bounding region enclosing the one second geographical location; computing a distance between the first minimum bounding region and the second minimum bounding region; and if the distance is greater than the threshold, then discarding the document by not including the document in a search result identified in response to the search query.

In particular embodiments, accessing a search query and a document identified in response to the search query; extracting a first geographical location from the search query or from information associated with a user issuing the search query or a device used by the user to issue the search query; constructing a first location feature for the search query based on the first geographical location and a location hierarchy, wherein the first location feature comprises the first geographical location; extracting one or more second geographical locations from the document; constructing a second location feature for the document based on the second geographical locations and the location hierarchy, wherein the second location feature comprises one or more of the second geographical locations; comparing the first location feature and the second location feature; and if there is no match between any geographical location of the first location feature and any geographical location of the second location feature, then discarding the document by not including the document in a search result identified in response to the search query.

These and other features, aspects, and advantages of the disclosure are described in more detail below in the detailed description and in conjunction with the following figures.

DETAILED DESCRIPTION

Figure 1:
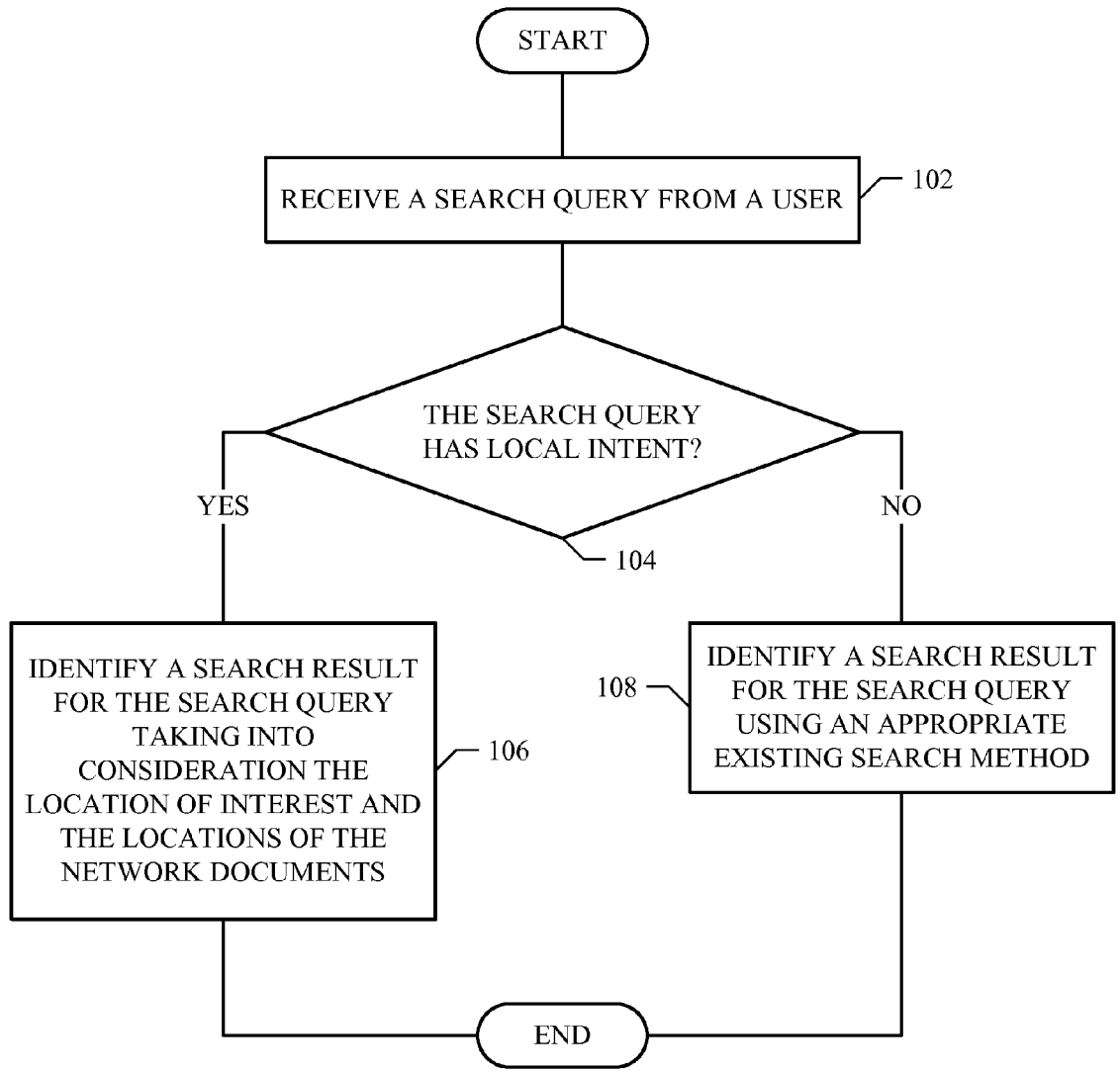
FIG. 1 illustrates an example method for taking locations into consideration when identifying search results in response to search queries that have local intent.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Particular embodiments take location information into consideration when determining the degree of relevance of a network document with respect to a search query. The location information may not be the only feature of the network document to be considered and may be among multiple features considered when determining the degree of relevance of the network document with respect to the search query. For a search query that has local intent, particular embodiments may compare a location of interest associated with the search query with one or more locations extracted from the network document. If the location of interest is relatively close to the locations extracted from the network document, then the network document may be considered to have a relatively high degree of relevance with respect to the search query. On the other hand, if the location of interest is relatively far from the locations extracted from the network document, then the network document may be considered to have a relatively low degree of relevance or no relevance with respect to the search query.

A search engine is a computer-implemented tool designed to search for information relevant to specific subject matters or topics on a network, such as the Internet, the World Wide Web, or an Intranet. To conduct a search, a network user may issue a search query to the search engine. The search query generally contains one or more tokens, such as words or numbers, that describe a subject matter. In response, the search engine may identify one or more network documents that are likely to be related to the search query, which may collectively be referred to as a "search result" identified for the search query. The network documents may have any format, including, for example and without limitation, web pages, executable files, multimedia files (e.g., image, video, or audio), and text files (e.g., Microsoft World files or Adobe Portable Document Format (PDF) files). The network documents are usually ranked and presented to the network user according to their relative degrees of relevance to the search query.

Sophisticated search engines implement many other functionalities in addition to merely identifying the network documents as a part of the search process. For example, a search engine usually ranks the network documents identified for a search query according to their relative degrees of relevance with respect to the search query, such that the network documents that are relatively more relevant to the search query are ranked higher and consequently are presented to the network user before the network documents that are relatively less relevant to the search query. The search engine may also provide a short summary of each of the identified network documents.

Sometimes, a search query may describe a subject matter that may be associated with one or more geographical or physical locations. For example, search query "Disneyland" is likely to be connected with Anaheim, Calif.; search query "Metropolitan Museum of Art" is likely to be connected with New York City; and search query "Lincoln Memorial" is likely to be connected with Washington D.C. Other times, a search query may describe a subject matter that may be independent of (i.e. having no strong connection or association with) any specific geographical location. For example, search queries such as "Harry Potter", "Angelina Jolie", "Safeway coupons", or "MP3 player" are unlikely to be connected with any specific geographical location. With search query "Angelina Jolie", the user is more likely to be interested in information concerning the actress herself, regardless of where the actress is located or where the user is located at the time the user requests the search. With search query "Safeway coupons", the coupons may be used at any Safeway stores, regardless of where a particular store is located. In the context of the present disclosure, a search query describing a subject matter that is likely to be associated with one or more geographical locations is considered to have "local intent", and a location associated with such a search query is referred to as a "location of interest" (LOI) of the search query.

In particular embodiments, when identifying a set of network documents in response to a search query that has local intent, to determine the degree of relevance of a specific network document with respect to the search query, the location information of the network document, if any, may be taken into consideration. The location of the network document may not necessarily be the only feature of the network document considered and may be among multiple features of the network document to be considered when determining the degree of relevance of the network document with respect to the search query. That is, the degree of relevance of the network document with respect to the search query may be an average or a blend of multiple features of the network document, one of which is the location feature.

FIG. 1 illustrates an example method for taking locations into consideration when identifying search results in response to search queries that have local intent. When a user issues a search query (step 102), particular embodiments may determine whether the search query has local intent and is associated with one or more locations of interest (step 104). There are various ways to determine whether a search query has local intent, and the present disclosure contemplate any suitable means for determining whether a search query has local intent.

Sometime, for a search query that is likely to be associated with one or more geographical locations (i.e., a search query that has local intent), the locations may be explicitly indicated by the words of the search query. For example, search queries such as "Paris Eiffel Tower", "Westminster Abbey in London", "Chinese restaurants in San Francisco", or "Walmart San Jose" each contain words that explicitly specify the locations of the subject matters or the information the users search for. With search query "Walmart San Jose", using words "San Jose", the user explicitly indicates that the Walmart stores in which the user is interested should be located in the city of San Jose. In the context of the present disclosure, a search query that includes words explicitly indicating a geographical location connected with the subject matter the user searches for is considered to have "explicit local intent". Other times, for a search query that has local intent, the locations may be implicitly indicated by the words of the search query. That is, there is no word in the search query that specifically refers to a location. Instead, the local intent of the search query may be inferred from the words of the search query. For example, search queries such as "Italian restaurants", "Apple stores", or "movie theaters" describe subject matters that are likely to be associated with certain specific locations (e.g., an Italian restaurant typically exits in the real world and has a physical address), and yet, there is no word in these search queries that explicitly indicate any geographical location. In such cases, the local intent of the search queries may be inferred from the words of the search queries. For example, since search query "Apple stores" describe retail stores that exist in the real world, these stores are most likely to be located somewhere and thus have actual locations. In the context of the present disclosure, a search query that includes words from which local intent may be inferred and yet does not include any word that explicitly indicates any location is considered to have "implicit local intent".

Sometimes, for a search query that has local intent, either explicit or implicit, the local intent may be specific. That is, there are only a relatively few specific locations that may be associated with the search query. In the examples above, search query "Disneyland" is most likely to be connected with Anaheim; search query "Metropolitan Museum of Art" is most likely to be connected with New York City; and search query "Lincoln Memorial" is most likely to be connected with Washington D.C. In each of these cases, the location associated with the example search query is fairly unique. For example, there is only one Lincoln Memorial, and it is located on the National Mall in Washington D.C. Thus, there is only one location (i.e., Washington D.C.) associated with search query "Lincoln Memorial". Similarly, there is only one location, Anaheim, associated with search query "Disneyland". In the context of the present disclosure, a search query that describes a subject matter that is likely to be associated with a relatively small number of geographical locations is considered to have "specific local intent". Other times, for a search query that has local intent, the local intent may be general. That is, the subject matter described by the search query may be associated with many possible locations. For example, there may be many Italian restaurants located in different cities, different states, and different countries. Thus, search query "Italian restaurants" may be connected with many possible locations. Furthermore, the connections that search query "Italian restaurants" has with the many possible locations may be similarly strong or similarly weak, since the words of search query "Italian restaurants" do not suggest which location the user is more or less interested in locating the Italian restaurants. In other words, there is no bias toward any of the locations possibly associated with search query "Italian restaurants". In the context of the present disclosure, a search query that describes a subject matter that is likely to be associated with a relatively large number of physical locations and there is no strong bias toward any of the possibly associated locations is considered to have "general local intent".

In particular embodiments, a search-query classifier, or simply a query classifier, may be used to determine whether a given search query has local intent, either explicit or implicit, either specific or general. In particular embodiments, the query classifier is a machine-learning model. Given a search query, the machine-learning model may predict the likelihood or the probability that the search query has local intent. In particular embodiments, the likelihood or the probability is represented as a real number. In particular embodiments, the likelihood or the probability is represented as a real number between 0 and 1, with 0 indicating that the search query has no local intent (i.e., a very low likelihood that the search query has local intent) and 1 indicating that the search query has local intent (i.e., a very high likelihood that the search query has local intent). For example, the example search query "Paris Eiffel Tower" should have a predicted probability of close to 1 indicating a high likelihood of local intent, while the example search query "MP 3 player" should have a predicted probability of close to 0 indicating a low likelihood of local intent.

In particular embodiments, the probability predicted for the search query may then be compared against a predetermined threshold requirement. If the predicted probability satisfies the threshold requirement, the search query is considered to have local intent; otherwise, if the predicted probability does not satisfy the threshold requirement, the search query is considered not to have local intent.

Particular embodiments may train a query classifier through machine learning so that the query classifier is able to automatically determine whether a particular search query has local intent by, for example, predicting the probability that the search query has local intent. Machine learning, briefly, is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience. The data are applied to the algorithms in order to "train" the algorithms, and the algorithms are adjusted (i.e., improved) based on how they respond to the data. The data are thus often referred to as "training data". Typically, a machine learning algorithm is organized into a taxonomy based on the desired outcome of the algorithm. Examples of algorithm types may include supervised learning, unsupervised learning, semi-supervised learning, reinforcement learning, transduction, and learning to learn. With transduction, the algorithms typically try to predict new outputs for new inputs based on training inputs, training outputs, and test inputs.

In particular embodiments, if the search query has local intent (step 104, "YES"), the search result, which may include one or more network documents, is identified for the search query taking into consideration at least the location of interest of the search query and the locations of the individual network documents (step 106). On the other hand, if the search query does not have local intent (step 104, "NO"), the search result may be identified for the search query using an appropriate existing method that may not necessarily take the location of interest of the search query and the locations of the individual network documents into consideration (step 108).

Figure 2A:
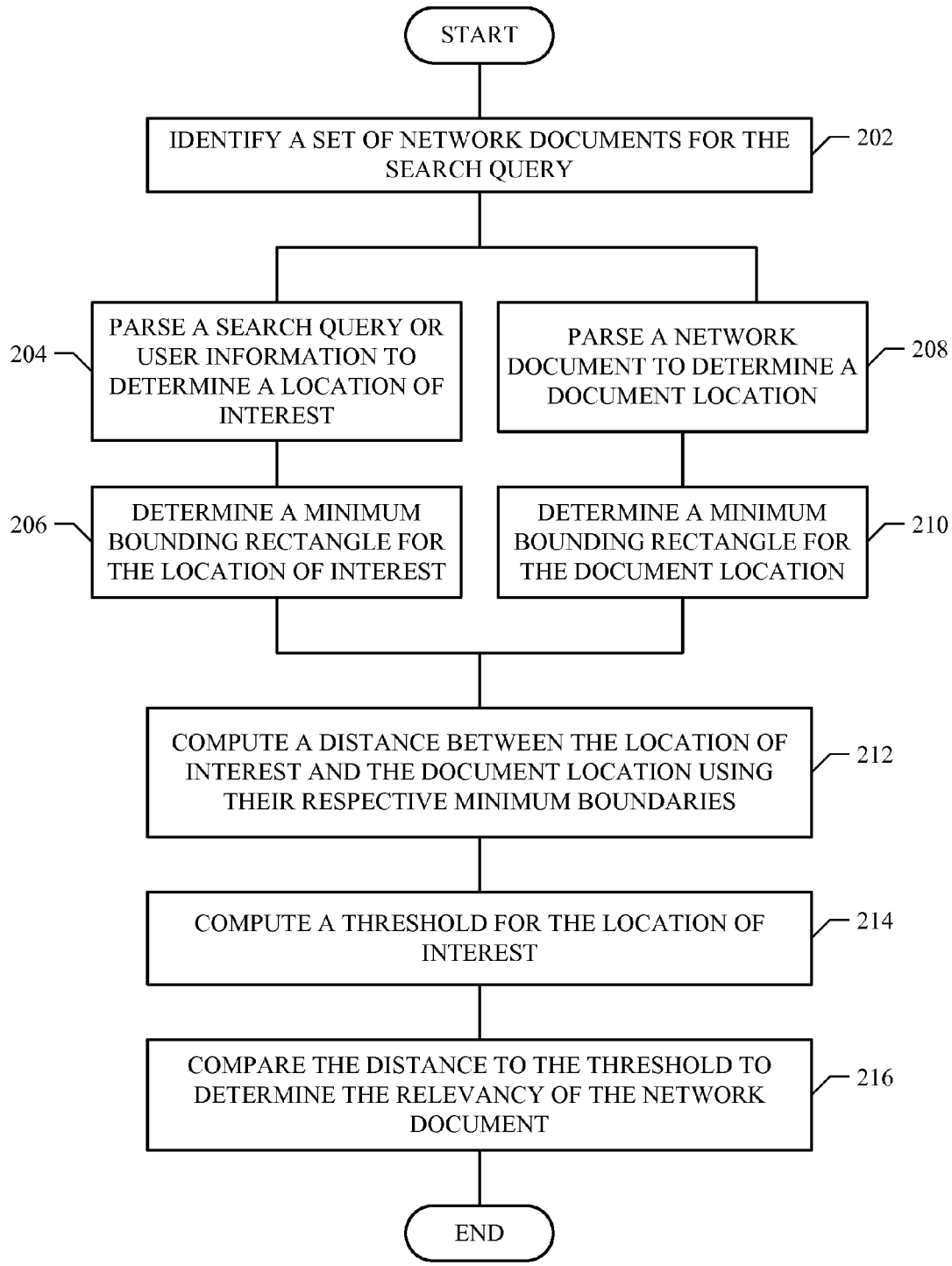
FIG. 2A illustrates a first example method for comparing a location of interest associated with a search query and a document location of a network document.

FIG. 2 illustrates a first example method for comparing a location of interest associated with a search query and a document location of a network document. This method focuses on the location feature when determining the degree of relevance of a network document with respect to a search query. It may be used in connection with other methods that analyze other types of features used to determine the degree of relevance of a network document with respect to a search query.

Suppose a search query has been determined to have local intent using an appropriate method, such as, for example, the one described in connection with step 104 of FIG. 1. Particular embodiments may identify a set of network documents for the search query, again, using an appropriate method (step 202). For example, the set of network documents may be identified by comparing the words or numbers of the search query with the words or numbers in the individual network documents using an inverted index. Since the search query has been determined to have local intent, particular embodiments may further analyze the degree of relevance of each of the network documents in the set while taking the location information into consideration. Steps 204-216 describe the analysis for one network document in the set with respect to the search query. Some of the steps (e.g., steps 208-216) may be similarly repeated once for each of the network documents in the set. In addition, some of the steps may be performed in orders different than the order illustrated in FIG. 2.

Particular embodiments may determine a location of interest associated with the search query based on the words or numbers in the search query or other available information, such as information associated with the user issuing the search query or the network device used by the user to request the search (step 204). As described above, sometimes, a search query may include words or numbers that indicate a geographical location. The words or numbers may be, for example, street address, city name, county name, state name, country name, or zip code. In this case, the search query is considered to have explicit local intent. For example, search query "Italian restaurant San Francisco" includes a city name (i.e., San Francisco). When the search query has explicit local intent, the location of interest associated with the search query may be obtained by parsing the search query to extract the location information directly from the search query itself. Thus, parsing example search query "Italian restaurant San Francisco" may provide "San Francisco" as its associated location of interest.

Particular embodiments may utilize a concept tagger to automatically parse the search query. In particular embodiment, the concept tagger may examine the individual tokens (i.e., words and numbers) in a search query to determine a concept represented by each token. Of course, not all tokens necessarily represent specific concepts. The concept tagger may determine whether a word represents a person's name (e.g., first name or surname), a business' name, a business type, a location name (e.g., street, city, town, county, state, province, country, or continent), and so on, or whether a number represents a zip code, a quantity, and so on. Based on the concepts assigned to the individual tokens of the search query, particular embodiments may determine whether the search query explicitly includes a specific geographical location and if so, what location.

Sometimes, a search query does not necessarily include any word or number that explicitly indicates a geographical location but nevertheless has local intent. In this case, the search query is considered to have implicit local intent. For example, search query "Italian restaurant" does not include any location information but since a restaurant generally exists in the physical world, it is likely to have a physical address and be associated with a geographical location. When the search query has implicit local intent, the location of interest associated with the search query may be obtained from other informational sources, such as the information associated with the user issuing the search query or the network device used by the user to issue the search query. The present disclosure contemplates any suitable informational sources.

For example, when a person registers for an account with a network application service (e.g., Yahoo® email or Microsoft Live® email), the person may provide specific demographical information, either voluntarily or mandatorily, about himself, which may include his home address, work address, or mailing address. If such information is available, particular embodiments may use an address (e.g., the home address) provided by the user issuing the search query as the location of interest associated with the search query.

As another example, when issuing the search query to conduct a search on a network, the user needs to be connected to the network through a network device. The network device generally has an Internet Protocol (IP) address, which may be static or dynamic. Particular embodiments may determine a location based on the IP address of the network device used by the user when issuing the search query and use this location as the location of interest associated with the search query.

Often, the location of interest thus determined may not be a single point but may more likely indicate a region, such as a city or a state. In the above example where San Francisco is the location of interest associated with search query "Italian restaurant", San Francisco is a city that is approximately 232 square miles. An Italian restaurant may be located anywhere within the 232 square miles. Particular embodiments may determine a minimum bounding region that completely encloses the location of interest (e.g., the city of San Francisco) (step 206). In particular embodiments, the minimum bounding region is the smallest region that is capable of completely enclosing the location of interest. The minimum bounding region may have any suitable geometric shape, such as, for example and without limitation, circle, square, rectangle, triangle, or multi-side polygon. Moreover, it is possible to use the actual boundary, if one exists, of the location of interest as its minimum bounding region. For example, with a city, the city limit or boundary may be used as its minimum bounding region.

Particular embodiments may use a rectangle as the shape of the minimum bounding region of the location of interest. A minimum bounding rectangle (MBR), also known as a minimum bounding box, is an expression of the maximum extents of a two-dimensional object within its two-dimensional (x, y) coordinate system. The two-dimensional coordinates of the four vertices of the MBR may be represented using min (x), max(x), min(y), and max(y).

A network document may include one or more locations either in the main content of the network document or among the metadata associated with the network document. For example, a web page that includes reviews of the restaurants located in various cities in the San Francisco Bay Area may include addresses of some of the restaurants being reviewed. An image (e.g., a digital photograph) may have an associated tag indicating the location where the photograph was taken. Particular embodiments may parse a network document identified for the search query to extract one or more locations from either the main content or the metadata of the network document (step 208). The words or numbers of a network documents may be parsed similarly as those of the search query. For example, the concept tagger may similarly determine specific concepts represented by the individual words or numbers of the network documents, and based on these concepts, particular embodiments may extract individual locations from the main content or the metadata of the network document. If a specific network document does not include any location information (i.e., null location information), either in its main content or its associated metadata, particular embodiments may still consider the network document somewhat relevant to the search query, but the degree of relevance of such a network document may be relatively low.

For each of the locations, if any, extracted from the network document, particular embodiments may determine a minimum bounding region that completely encloses the location (step 210). Again, the minimum bounding region may have any suitable shape. Particular embodiments may determine a minimum bounding rectangle (MBR) for each location extracted from the network document.

Figure 2B:
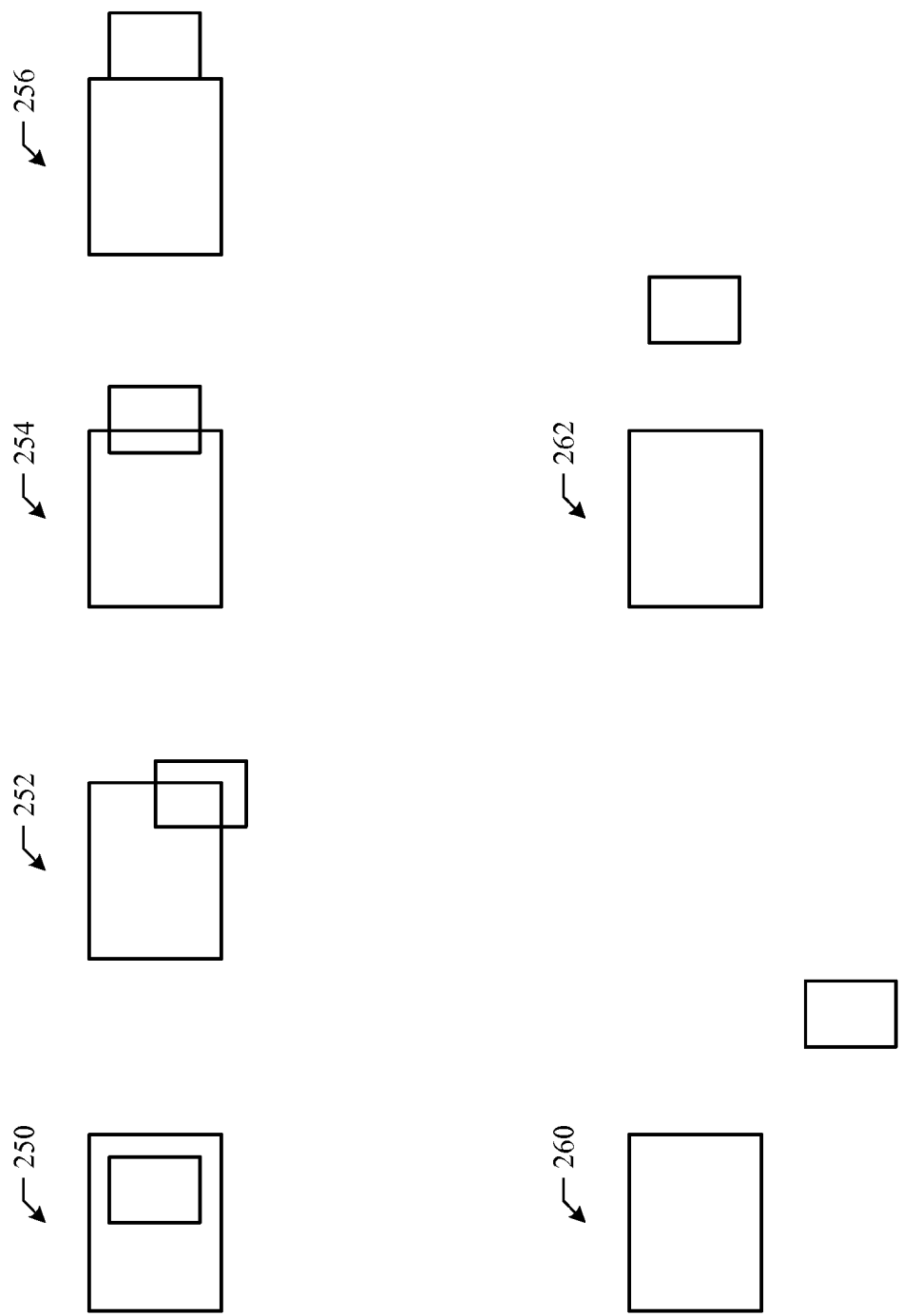
FIG. 2B illustrates several example positional relationships between two rectangles.

Consider the MBR of the location of interest associated with the search query and the MBR of any one of the locations extracted from the network document, which are essentially two rectangles. For any two rectangles, they may have several possible positional relationships, as illustrated in FIG. 2B. First, the two rectangles may overlap. When the two rectangles overlap, they may completely overlap (e.g., one rectangle encloses another rectangle), as illustrated with 250, or partially overlap, as illustrated with 252, 254, and 256. The partial overlap case may also include the case where the boundaries of the two rectangles touch, as illustrated with 256. Second, the two rectangles may not overlap, as illustrated with 260 and 262.

In particular embodiments, for each of the locations extracted from the network document, a distance is computed between the MBR of the location extracted from the network document and the MBR of the location of interest associated with the search query (step 212), which are essentially computing the distance between two rectangles. The distance between two MBRs may be computed using various methods, and the present disclosure contemplates any suitable method. For example, the distance may be computed as the distance between the respective centers of the two rectangles.

In particular embodiments, if the two rectangles (i.e., MBRs) overlap, either completely or partially, as illustrated with 250, 252, 254, and 256 in FIG. 2B, then the distance between the two rectangles is considered to be 0. On the other hand, if the two rectangles do not overlap, as illustrated with 260 and 262 in FIG. 2B, then the distance between the two rectangles is computed as the shortest distance between any one of the vertices from the first rectangle and any one of the vertices from the second rectangle. For example, with 260, the distance between these two rectangles equals the distance between the lower-right vertex of the rectangle on the left and the upper-left vertex of the rectangle on the right.

For cases where the two MBRs do not overlap, the distance between two vertices from the two MBRs, respectively, is essentially the distance between two points, since each vertex is essentially a point. In general, given two points $p_1$ and $p_2$ having coordinates $(x_1, y_1)$ and $(x_2, y_2)$, respectively, the Euclidean distance between the two points equals $d(p_1, p_2) = \sqrt{(x_1-x_2)^2 + (y_1-y_2)^2}$. However, the Euclidean distance assumes that the two points are on a flat surface and the surface of the Earth is not flat but curved. Thus, when computing the distance between two vertices of two MBRs, particular embodiments may also take into account the curvature of the surface of the Earth. The following sample code illustrates one particular implementation for computing the distance between two MBRs taking into account the curvature of the surface of the Earth.

```
double radians(double lat1, double lon1, double lat2, double
lon2)
{
  double lat1r = lat1 * Math.PI / 180;
  double lon1r = lon1 * Math.PI / 180;
  double lat2r = lat2 * Math.PI / 180;
  double lon2r = lon2 * Math.PI / 180;
  double dist = 2.0*
Math.asin(Math.sqrt(Math.pow(Math.sin((lat1r-lat2r)/2.0),2.0)+
Math.cos(lat1r)*Math.cos(lat2r)*
Math.pow(Math.sin((lon1r-lon2r)/2.0),2.0)));
  return dist;
}
double miles(double lat1, double lon1,
```

-continued

```
double lat2, double lon2)
{
  return
radians(lat1,lon1,lat2,lon2)*180.0*60.0/Math.PI*3963.16;
}
double boxToBoxMiles2(double NELat1, double NELon1,
double SWLat1, double SWLon1, double NELat2, double NELon2,
double SWLat2, double SWLon2)
{
  // Do we have an overlap on both x and y?
  if (((SWLat1 <= NELat2 && NELat2 <= NELat1) || (SWLat1 <=
SWLat2 && SWLat2 <= NELat1)
        || (SWLat2 <= NELat1 && NELat1 <= NELat2) || (SWLat2 <=
SWLat1 && SWLat1 <= NELat2))
      && ((SWLon1 <= NELon2 && NELon2 <= NELon1) || (SWLon1 <=
SWLon2 && SWLon2 <= NELon1)
        || (SWLon2 <= NELon1 && NELon1 <= NELon2) || (SWLon2
<= SWLon1 && SWLon1 <= NELon2)))
  {
    return 0; // If there is an overlap, distance is zero
  }
  else if ((SWLat1 <= NELat2 && NELat2 <= NELat1) || (SWLat1
<= SWLat2 && SWLat2 <= NELat1)
        || (SWLat2 <= NELat1 && NELat1 <= NELat2) || (SWLat2
<= SWLat1 && SWLat1 <= NELat2)) // x overlap only?
  {
    return Math.min(miles(0,0,0,Math.abs(SWLon1-
NELon2)),miles(0,0,0,Math.abs(NELon1-SWLon2)));
  }
  else if ((SWLon1 <= NELon2 && NELon2 <= NELon1) || (SWLon1
<= SWLon2 && SWLon2 <= NELon1)
        || (SWLon2 <= NELon1 && NELon1 <= NELon2) ||
(SWLon2
<= SWLon1 && SWLon1 <= NELon2))
  {
    return Math.min(miles(0,0,Math.abs(SWLat1-
NELat2),0),miles(0,0,Math.abs(NELat1-SWLat2),0));
  }
  else // No overlap!
  {
    double x =
Math.min(Math.abs(SWLon1-NELon2),Math.abs(NELon1-SWLon2));
    double y =
Math.min(Math.abs(SWLat1-NELat2),Math.abs(NELat1-SWLat2));
    return miles(0,0,x,y);
  }
}
```

If only one location is extracted from the network document, then there is only one distance between the MBR of the location extracted from the network document and the MBR of the location of interest associated with the search query. On the other hand, if multiple locations are extracted from the network document, then there are multiple distances between the MBRs of the individual locations extracted from the network document and the MBR of the location of interest associated with the search query, respectively. In this case, particular embodiments may select the shortest distance among all the distances for further analysis. This shortest distance may then be considered as the representative distance between the MBR of a location extracted from the network document and the MBR of the location of interest associated with the search query.

Particular embodiments may compare the representative distance, which is either the only distance computed if only one location is extracted from the network document or the shortest distance if multiple locations are extracted from the network document, with a threshold computed for the location of interest associated with the search query.

Particular embodiments may dynamically compute a threshold for a specific location of interest associated with a specific search query (step 214). Thus, different locations of interest may have different threshold values. In particular embodiments, the threshold for a location of interest associated with a search query may be computed based on: (1) the probability that the search query has local intent; and (2) the population at the location of interest, according to the following:

$$T_{dynamic} = \frac{T_{static}}{L_{query} \times P_{LOI}}.$$

Given a search query and an associated location of interest (LOI), $T_{dynamic}$ denotes the threshold dynamically computed for the search query and its associated location of interest. $T_{static}$ is a static threshold, which may be predetermined based on experiments. $L_{query}$ is a real value between 0 and 1 that indicates the probability that the search query has local intent, which may be obtained as described in connection with step 104 of FIG. 1. Thus, $L_{query}=1$ indicates that there is a very high probability that the search query has local intent, and $L_{query}=0$ indicates that there is a very low probability that the search query has local intent. $P_{LOI}$ is a normalized population at the location of interest associated with the search query. In particular embodiments, $P_{LOI}$ may be a real value between 0 and 1.

Particular embodiments normalizes $P_{LOI}$ because people in different regions around the world may behave differently due to the different population densities in the specific regions. For example, in a region that has a relatively high population density (e.g., San Francisco, New York, London, or Paris), people may not be willing to travel very far in order to go to a restaurant. In contrast, in a region that has a relatively low population density (e.g., in rural areas), people may be more willing to travel for greater distances to go to a restaurant. Thus, what is considered "close" or "far" may be different to people in different regions. Particular embodiments may normalize $P_{LOI}$ based on: (1) the actual population at the location of interest; and (2) the area of the location of interest, according to the following:

$$P_{LOI} = \tanh\left(\frac{D_{LOI}}{D_{country} \times e}\right);$$

where $D_{LOI}$ is the population density at the location of interest associated with the search query; and $D_{country}$ is the population density of the country in which the location of interest is located. In particular embodiments, $D_{LOI}$ may be computed as:

$$D_{LOI} = \frac{N_{LOI}}{A_{LOI}};$$

where $N_{LOI}$ is the actual population of the location of interest, and $A_{LOI}$ is the size (i.e., area size) of the location of interest, both of which may be determined based on publicly available information, such as census data and geographical survey information. Similarly, $D_{country}$ may be computed as:

$$D_{country} = \frac{N_{country}}{A_{country}};$$

where $N_{country}$ is the actual population of the country in which the location of interest is located, and $A_{country}$ is the size of the country in which the location of interest is located, again, both of which may be determined based on publicly available information.

Particular embodiments may compare the representative distance between the location of interest associated with the search query and a location extracted from the network document with the dynamic threshold, $T_{dynamic}$, computed for the search query and its associated location of interest (step 216). If the representative distance is greater than the dynamic threshold, $T_{dynamic}$, then particular embodiments may consider the network document not relevant to the search query. In this case, particular embodiments may remove this network document from the set of network documents identified for the search query, as described in connection with step 202. On the other hand, if the representative distance is less than or equal to the dynamic threshold, $T_{dynamic}$, then particular embodiments may consider the network document relevant to the search query. In this case, particular embodiments may keep this network document in the set of network documents identified for the search query, again, as described in connection with step 202.

Between multiple network documents identified for a search query where their respective representative distances are all less than or equal to $T_{dynamic}$, particular embodiments may consider a network document having a relatively shorter representative distance to be relatively more relevant to the search query than a network document having a relatively longer representative distance. In addition, as indicated above in connection with step 208, if a specific network document does not include any location information, either in its main content or its associated metadata, particular embodiments may still consider the network document somewhat relevant to the search query and keep this network document in the set of network documents identified for the search query. However, particular embodiments may consider such a network document less relevant than those network documents having respective representative distances that are less than or equal to $T_{dynamic}$. Consequently, particular embodiments may take into consideration the respective representative distances of the network documents when ranking the network documents for the search query in terms of their relevancy with respect to the search query.

The embodiments illustrated in FIG. 2 take the location information into consideration when identifying network documents for a search query by examining the distances between a location of interest associated with the search query and locations of the network documents, respectively. This approach may be referred to as "proximity" approach.

Figure 3A:
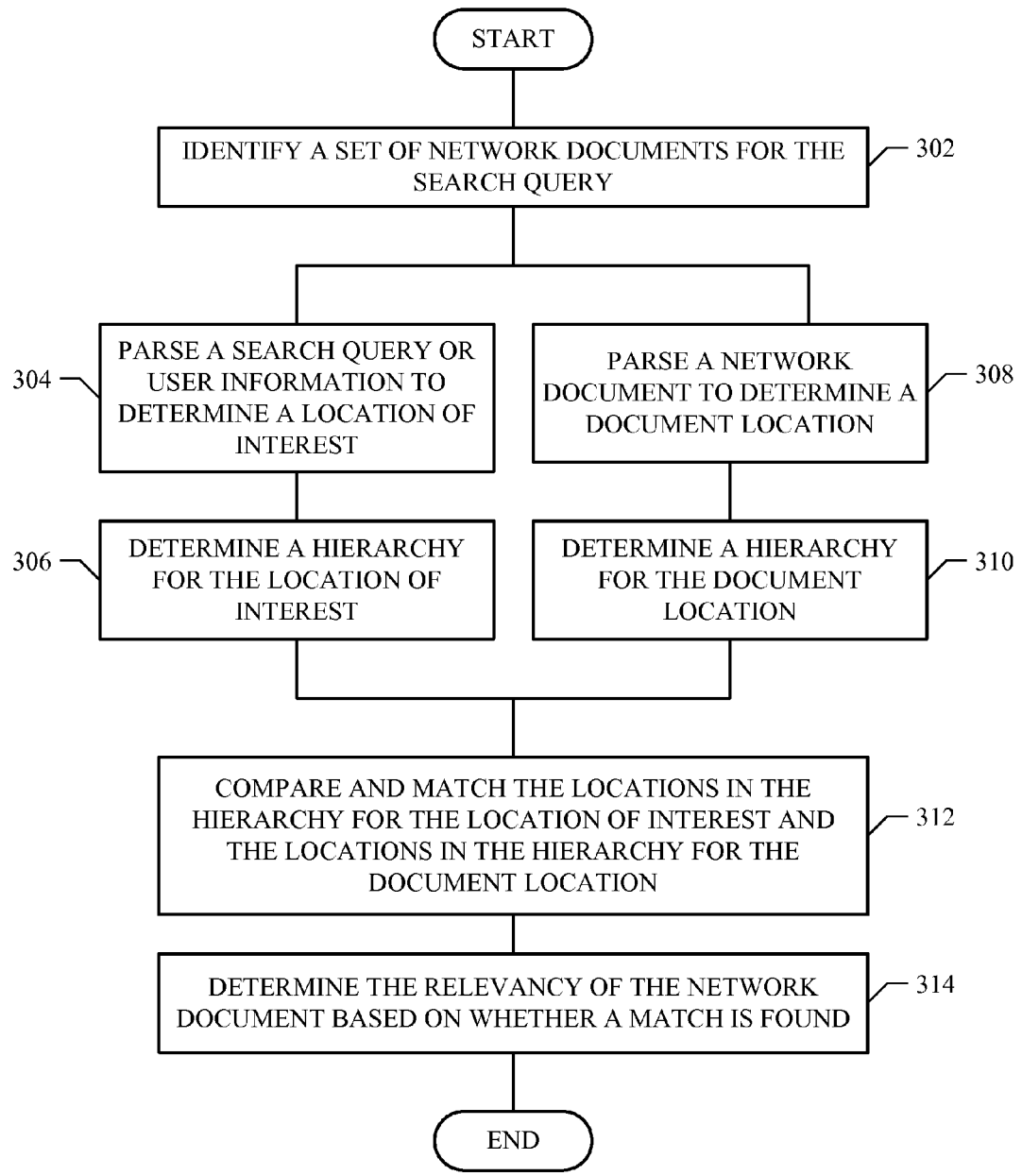
FIG. 3A illustrates a second example method for comparing a location of interest associated with a search query and a document location of a network document.

FIG. 3A illustrates a second example method for comparing a location of interest associated with a search query and a location of a network document. Again, this method focuses on the location feature when determining the degree of relevance of a network document with respect to a search query. It may be used in connection with other methods that analyze other types of features used to determine the degree of relevance of a network document with respect to a search query.

Suppose a search query received at a search engine. Particular embodiments may identify a set of network documents for the search query (step 302). The set of network documents may be identified using any appropriate method, such as, for example, the one described in connection with step 202 of FIG. 2. Particular embodiments may further filter the set of network documents based on the locations of interest associated with the search query and the locations extracted from the individual network documents. Steps 304-314 describe the analysis for one network document in the set with respect to the search query. Some of the steps (e.g., steps 308-314)

may be similarly repeated once for each of the network documents in the set. In addition, some of the steps may be performed in orders different than the order illustrated in FIG. 3A.

Particular embodiments may determine a location of interest associated with the search query based on the words or numbers in the search query or other available information, such as information associated with the user issuing the search query or the network device used by the user to request the search (step 304). Particular embodiments may determine the location of interest associated with the search query using any appropriate method, such as, for example, the one described in connection with step 204 of FIG. 2.

Figure 3B:
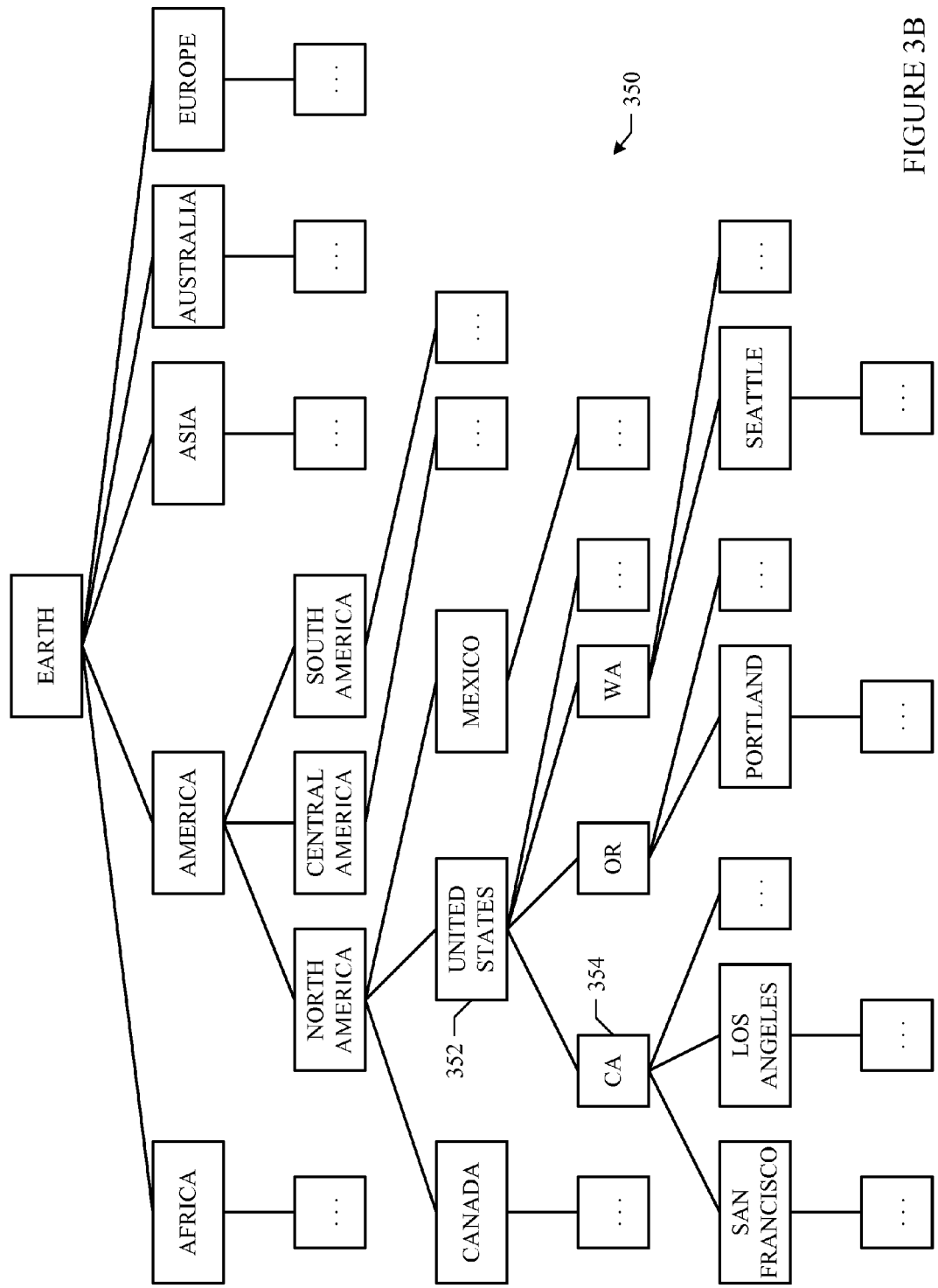
FIG. 3B illustrates an example location hierarchy.

Geographical locations often have a natural hierarchy, such as from larger areas to smaller areas. At the top level of the hierarchy is the planet Earth. The next level may be the continents (e.g., America, Asia, Australia, Africa, Europe). The next level under the continents may be the countries on the individual continents. The next level under the countries may be the states, provinces, territories, or regions. The next level may be the counties or cities, towns or villages, and so on. A location hierarchy may be constructed either based on the natural hierarchy of the geographical locations or based on other suitable rules. Such a location hierarchy may be represented as a tree structure. FIG. 3B illustrates an example location hierarchy represented as a tree structure 350. Each node of tree 350 represents a location. Traversing from the root to the leaves of tree 350, there are multiple branches and multiple levels along each branch. For any given node in tree 350, the location represented by the node encompasses all the locations represented by the nodes at levels below the level of that node descending from that node. For example, the node 352 represents the United States. At the next level below the level of node 352 and descending from node 352 are the nodes representing the individual states of the United States, one of which is node 354 represented California. At the next level below the level of node 354 and descending from node 354 are the nodes representing the individual cities in California. The United States, represented by node 352, encompasses all the locations represented by the nodes descending from node 352. Similarly, California, represented by node 354, encompasses all the locations represented by the nodes descending from node 354.

Particular embodiments may determine those levels in the location hierarchy that are above the level of the location of interest associated with the search query (step 306). In the above example where San Francisco is the location of interest associated with search query "Italian restaurant", the levels in the location hierarchy that are above San Francisco, which is a city, may include San Francisco County, Calif., and United States. These levels in the location hierarchy that are above or at the level of the location of interest may together be referred to as the "location feature" of the search query. In addition, particular embodiments may add a "null" location to the location feature of the search query to deal with cases where a network document does not include any location information.

A network document may include one or more locations either in the main content of the network document or among the metadata associated with the network document. Particular embodiments may parse a network document identified for the search query to extract one or more locations from either the main content or the metadata of the network document (step 308). Particular embodiments may extract the locations from the network document using any appropriate method, such as, for example, the one described in connection with step 208 of FIG. 2. Similarly, particular embodiments may determine those levels in the location hierarchy that are above the level of each of the locations extracted from the network document (step 310). These levels in the location hierarchy that are above or at the levels of the locations extracted from the network document together be referred to as the "location feature" of the network document.

Particular embodiments may then compare the location feature of the search query and the location feature of the network document (step 312) and determine the degree of relevance of the network document with respect to the search query based on whether a match may be found between the location feature of the search query and the location feature of the network document (step 314). The analysis in connection with steps 312 and 314 may be conducted using various algorithms.

In particular embodiments, the analysis may be conducted using a relatively simple algorithm. This simple algorithm requires less storage and computational resources, but the result may be somewhat less accurate. In particular embodiments, with the simple algorithm, the location feature of the search query includes the location of interest itself, the levels in the local hierarchy above the level of the location of interest, and a null location. The location feature of the network document includes the locations extracted from the network document that are at the lowest level within each branch in the location hierarchy. If no location is extracted from the network document, then the location feature of the network document only includes a null location. Note that unlike in the case of the search query, if any location is extracted from the network document, then a null location is not added to the location feature of the network document.

For example, suppose only a single location, California, is extracted from the network document. In this case, the location feature of the network document only includes California, which is at the lowest level of its corresponding branch in the location hierarchy. As another example, suppose multiple locations are extracted from the network document, including San Francisco, Sacramento, and California. California is at a level higher than that of both San Francisco and Sacramento, while San Francisco and Sacramento, which are both cities, are at the lowest level of their respective branches in the location hierarchy, as one branch may include United States→California→San Francisco, and another branch may include United States→California→Sacramento. In this case, the location feature of the network document includes San Francisco and Sacramento, but not California, as California is not at the lowest level of a branch among the locations extracted from the network document. As a third example, again, suppose multiple locations are extracted from the network document, including San Francisco, Calif., and Oregon. Although both California and Oregon are states, among the three locations extracted from the network document, California is not at the lowest level in its corresponding branch because San Francisco is at a level below that of California. On the other hand, Oregon is at the lowest level in its corresponding branch because no other location inside the state Oregon has been extracted from the network document. The branch containing Oregon may include United States→Oregon. In this case, the location feature of the network document includes San Francisco and Oregon, although one is a city and one is a state. To summarize, if the locations extracted from a network document and its hierarchical information are represented using a tree structure, then the location feature of the network document includes the locations at the leaf nodes.

The following TABLE 1 illustrates several example search queries and network documents together with their respective location features.

TABLE 1

| Location of Interest Associated with Search Query | Location Feature of Search Query | Locations Extracted from Network Document | Location Feature of Network Document | Analysis Result |
|---|---|---|---|---|
| San Francisco | San Francisco, California, US, null | San Francisco, Oregon, Seattle | San Francisco, Oregon, Seattle | pass |
| San Francisco | San Francisco, California, US, null | Sacramento, Los Angeles, California | Sacramento, Los Angeles | fail |
| San Francisco | San Francisco, California, US, null | California | California | pass |
| San Francisco | San Francisco, California, US, null | no location | null | pass |
| California | California, US, null | San Francisco | San Francisco | fail |
| California | California, US, null | California, Portland, Oregon | California, Portland | pass |
| California | California, US, null | Nevada, Oregon | Nevada, Oregon | fail |
| no location | null | California | California | pass |
| no location | null | no location | null | pass |

Particular embodiments may compare the locations included in the location feature of the search query and the location feature of the network document. If any match is found between the two sets of location, then the network document is considered to be relevant with respect to the search query and remains in the set of network documents (i.e., pass). On the other hand, if no match is found between the two sets of location, then the network document is considered to be irrelevant with respect to the search query and is removed from the set of network documents (i.e., fail). In particular embodiments, if no location is extracted from a network document, that network document is considered to be relevant with respect to any search query. Similarly, if there is no location of interest associated with a search query, any network document is considered to be relevant.

For example, in row 1 of TABLE 1, San Francisco is in both the location feature of the search query and the location feature of the network document. Thus, there is a match and this network document is considered relevant to the search query and remains as one of the network documents included in the search result for the search query. In row 2 of TABLE, the location feature of the search query includes "San Francisco, Calif., US, null" while the location feature of the network document includes "Sacramento, Los Angeles". No match is found between the two location features. Thus, this network document is considered irrelevant to the search query and removed from the search result for the search query.

The following sample code illustrates one particular implementation for comparing the locations in the location feature of a search query and the location feature of a network document according to the simple algorithm.

```
if (there is only one query feature and that is null):
    pass
else:
    if (the doc feature matches any of the query features):
        pass
    else
        fail
```
-continued
```
    done
done
```

Given a search query and its associated location of interest, and a network document and the locations extracted from the network document, the logic behind this simple algorithm essentially indicates that if any location extracted from the network document is either at the level of the location of interest or at any level above the level of the location of interest along the branch to which the location of interest belongs in the location hierarchy, then the network document may be considered to be relevant to the search query. Otherwise, the network document may be considered to be irrelevant to the search query However, this logic may produce unsatisfactory results in some specific cases. Consider row 5 of TABLE 1. the location feature of the search query includes "California, US, null" while the location feature of the network document includes "San Francisco". Strictly speaking, there is no match between the two location features. Thus, according to the simple algorithm, the network document is irrelevant to the search query. However, San Francisco (i.e., the location extracted from the network document) is within the state of California (i.e., the location of interest associated with the search query). Thus, the user issuing the search query may still be interested in this network document. In this case, the simple algorithm, by removing this network document from the search result for the search query, may produce unsatisfactory result.

Alternatively, in particular embodiments, the analysis may be conducted using a relatively complicated algorithm. This second, complicated algorithm requires more storage and computational resources, but the result may be somewhat more accurate than that of the proceeding simple algorithm. With the complicated algorithm, the location feature of the search query and the location feature of the network document not only include the specific locations but their respective levels within the location hierarchy as well. If any location along a branch is missing, that location may be set to null.

The following TABLE 2 illustrates the same example search queries and network documents as those in TABLE 1 but with modification to their location features.

TABLE 2

| Location of Interest Associated with Search Query | Location Feature of Search Query | Locations Extracted from Network Document | Location Feature of Network Document | Analysis Result |
|---|---|---|---|---|
| San Francisco | city_San Francisco, state_California, country_US | San Francisco, Oregon, Seattle | city_San Francisco, state_California, country_US city_null, state_Oregon, country_US city_Seattle, state_Washington, country_US | pass |
| San Francisco | city_San Francisco, state_California, country_US | Sacramento, Los Angeles, California | city_Sacramento, state_California, country_US city_Los Angeles, state_California, country_US | fail |
| San Francisco | city_San Francisco, state_California, country_US | California | city_null, state_California, country_US | pass |
| San Francisco | city_San Francisco, state_California, country_US | no location | city_null, state_null, country_null | pass |
| California | city_null, state_California, country_US | San Francisco | city_San Francisco, state_California, country_US | pass |
| California | city_null, state_California, country_US | California, Portland, Oregon | city_null, state_California, country_US city_Portland, state_Oregon, country_US | pass |
| California | city_null, state_California, country_US | Nevada, Oregon | city_null, state_Nevada, country_US city_null, state_Oregon, country_US | fail |
| no location | city_null, state_null, country_null | California | city_null, state_California, country_US | pass |
| no location | city_null, state_null, country_null | no location | city_null, state_null, country_null | pass |

There are several differences in the construction of the location features between the second, complicated algorithm and the first, simple algorithm. First, with the search query, null is not added to its location feature. Second, with the network document, all locations extracted from the network document, not just the locations at the lowest level along each branch in the location hierarchy, are included in its location feature. Third, with both the search query and the network document, each location in the location features is associated with the level of the location (e.g., city, state, country) within the location hierarchy. Fourth, with both the search query and the network document, if there is a location along a particular branch in the location hierarchy, the locations at all the levels along that branch are included in the location feature, and if any location at any level is unavailable, that level has "null" location. For example, in row 5 of TABLE 2, the location of interest associated with the search query is California, which is a state. Thus, at the state level, California is the location. Since California is in the United States, at the country level, US is the location. There is no information on any specific city within California, and so at the city level, the location is null.

In particular embodiments, when comparing the location features of the search query and the network documents, the corresponding locations are compared within their own levels. That is, the city locations in the location feature of the network document are compared with the city locations in the location feature of the search query; the state locations in the location feature of the network document are compared with the state locations in the location feature of the search query; the country locations in the location feature of the network document are compared with the country locations in the location feature of the search query; and so on.

To determine whether a network document is relevant to a search query, particular embodiments compare the locations at the lowest level in the location hierarchy in the two location features where both locations are not null. If any match is found, then the network document is considered relevant with respect to the search query. If no match is found, then the network document is considered irrelevant with respect to the search query.

For example, in row 1 of TABLE 2, the lowest level at which both the location feature of the search query and the location feature of the network document have non-null locations is at the city level. For the location feature of the search query, at the city level, there is only one location: San Francisco. For the location feature of the network document, at the city level, there are two locations: San Francisco and Seattle. There is a match. Thus, this network document is considered relevant to the search query.

In row 2 of TABLE 2, the lowest level at which both the location features of the search query and the network document have non-null locations is again at the city level. For the location feature of the search query, at the city level, there is only one location: San Francisco. For the location feature of the network document, at the city level, there are two locations: Sacramento and Los Angles. There is no match. Thus, this network document is considered irrelevant to the search query.

In row 3 of TABLE 2, the lowest level at which both the location features of the search query and the network document have non-null locations is at the state level, because at the city level, the location feature of the network document only includes a null location. For the location feature of the search query, at the state level, there is only one location: California. For the location feature of the network document, at the state level, there is also only one location: California. There is a match. Thus, this network document is considered relevant to the search query.

Recall that with the first, simple algorithm illustrated in TABLE 1, the case in row 5 has an unsatisfactory result. In row 5 of TABLE 2, the lowest level at which both the location features of the search query and the network document have non-null locations is at the state level, because at the city level, the location feature of the search query only includes a null location. For the location feature of the search query, at the state level, there is only one location: California. For the location feature of the network document, at the state level, there is also only one location: California. There is a match. Thus, this network document is considered relevant to the search query. With the second, complicated algorithm, this network document may not be removed from the search result for the search query.

If either the location feature of the search query or the location feature of the network document includes only null locations at all levels, then particular embodiments may consider the network document to be relevant to the search query, as illustrated in rows 4, 8, 9 of TABLE 2.

The following sample code illustrates one particular implementation for comparing the locations in the location feature of a search query and the location feature of a network document according to the complicated algorithm.

```
if (all placetype features in query or doc are null
features):
    return pass
else:
    repeat:
    finest_query_feature = pick finest placetype feature
    in the query features that is not a null feature
        corresponding_doc_feature = pick corresponding
    placetype feature for doc
        if (corresponding_doc_feature is null):
            remove finest_query_feature from query feature
    llist and repeat from (1)
        else:
            if (finest query feature ==
    corresponding_doc_feature):
                return pass
            else:
                return fail
```

-continued

```
            done
        done
    done
```

Given a search query and its associated location of interest, and a network document and the locations extracted from the network document, the logic behind the second, more complicated algorithm essentially indicates that if (1) any location extracted from the network document is either at the level of the location of interest or at any level above the level of the location of interest along the branch to which the location of interest belongs in the location hierarchy, or (2) the location of interest is either at the level of any location extracted from the network document or at any level above the level of any location extracted from the network document along the branch to which any location extracted from the network document belongs in the location hierarchy, then the network document may be considered to be relevant to the search query. Otherwise, the network document may be considered to be irrelevant to the search query Although the various embodiments of the present disclosure have been described in the context of network search, the concept may be applied to any information retrieval applications. For example, when retrieving specific documents from a collection of documents (e.g., a database of documents) based on certain criteria, if there is a location of interest associated with the criteria or the person specifying the criteria, or if there is local intent associated with the criteria, location information may be taken into consideration similarly as searching for documents on a network in response to a search query.

Figure 4:
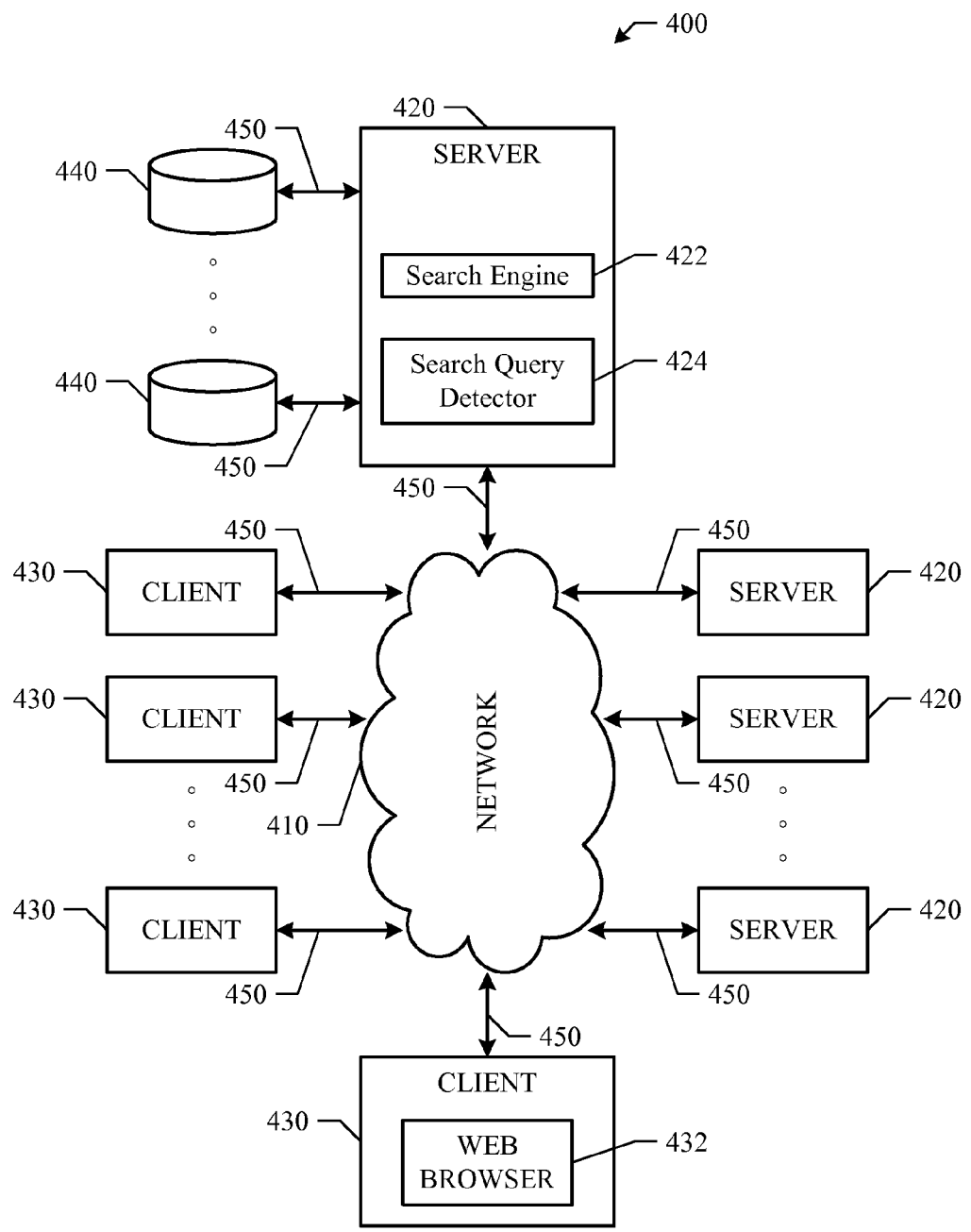
FIG. 4 illustrates an example network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, a server 420 may include a search engine 422. Search engine 422 may include hardware, software, or embedded logic components or a combination of two or more such components for carrying out the appropriate functionalities implemented or supported by search engine 422. For example and without limitation, search engine 422 may implement one or more search algorithms that may be used to identify network resources in response to the search queries received at search engine 422, one or more ranking algorithms that may be used to rank the identified network resources, one or more summarization algorithms that may be used to summarize the identified network resources, and so on. The ranking algorithms implemented by search engine 422 may be trained using the set of the training data constructed from pairs of search query and clicked URL. The methods illustrated in FIGS. 1-3 may be incorporated in search engine 422.

In particular embodiments, a server 420 may also include a search query detector 424. Search query detector 424 may include hardware, software, or embedded logic components or a combination of two or more such components for carrying out the appropriate functionalities implemented or supported by search query detector 424. For example and without limitation, search query detector 424 may determine whether a search query has local intent and compute a probability indicating the likelihood that the search query has local intent.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiment, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. The present disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
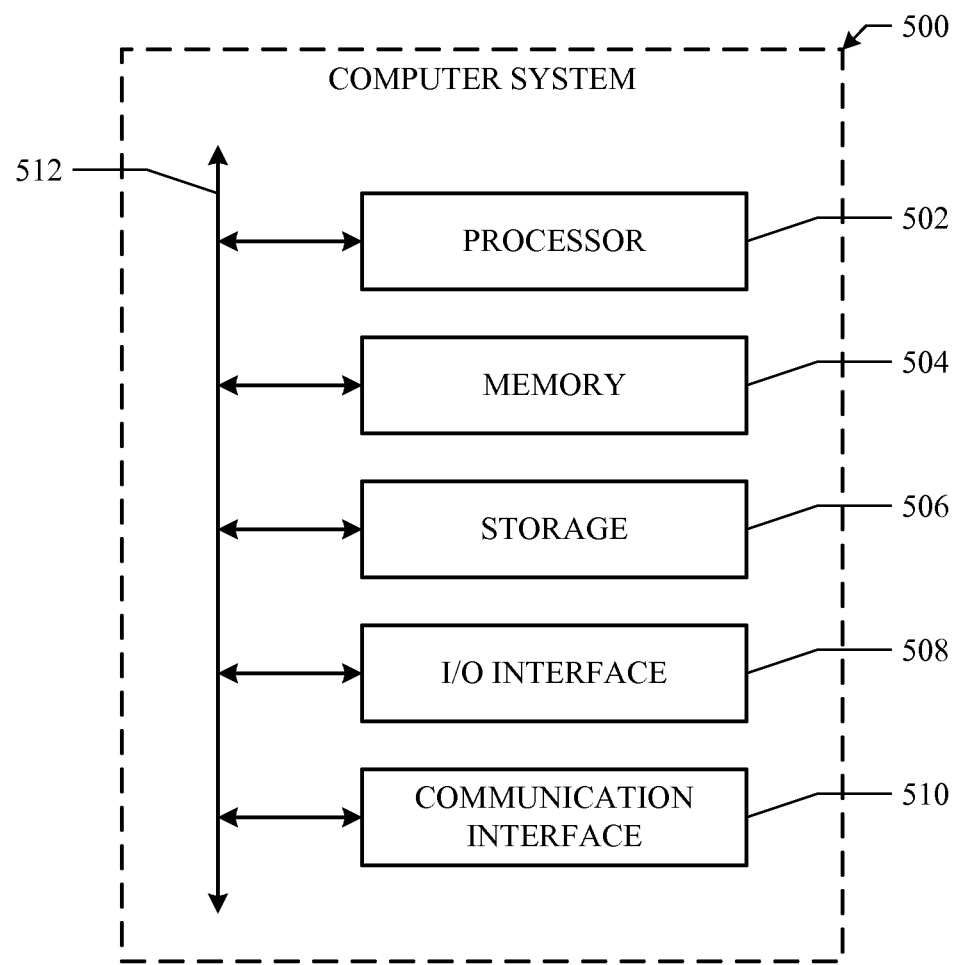
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
by one or more computing devices, accessing a search query and a document identified in response to the search query;
determining a probability that the search query has a local intent relating to a first geographical location;
wherein in response to the probability meeting or exceeding a threshold probability value:
determining a first minimum bounding region enclosing the first geographical location;
computing a threshold location value for the first geographical location based on a combination of the probability and a normalized population of the first geographical area;
extracting one or more second geographical locations from the document;
for the one or more second geographical locations,
determining a second minimum bounding region enclosing the one or more second geographical locations;
computing a distance between the first minimum bounding region and the second minimum bounding region; and
in response to determining that the distance is greater than the threshold location value, discarding the document by not including the document in a search result identified in response to the search query.

2. The method recited in claim 1, further comprising:
computing a normalized population density of the first geographical location based on a population density of the first geographical location and a population density of a country in which the first geographical location is located.

3. The method recited in claim 2, wherein the threshold probability for the first geographical location is computed based on a combination of a predetermined threshold value, the probability that the search query has the local intent relating to the first geographical location, and the normalized population density of the first geographical location.

4. The method recited in claim 1, wherein:
the first minimum bounding region comprises a first minimum bounding rectangle;

the second minimum bounding region comprises a second minimum bounding rectangle; and computing the distance between the first minimum bounding rectangle and the second minimum bounding rectangle comprises:
- determining whether the first minimum bounding rectangle and the second minimum bounding rectangle overlap;
- in response to determining that the first minimum bounding rectangle and the second minimum bounding rectangle overlap, setting the distance to 0; and
- in response to determining that the first minimum bounding rectangle and the second minimum bounding rectangle do not overlap, setting the distance to the shortest distance between any one of four vertices of the first minimum bounding rectangle and any one of four vertices of the second minimum bounding rectangle.

5. The method recited in claim 1, further comprising:
- determining one or more second minimum bounding regions enclosing the second geographical locations, wherein individual ones of the second minimum bounding regions enclose one of the second geographical locations;
- computing one or more distances between the first minimum bounding region and the second minimum bounding regions, wherein individual ones of the distances are between first minimum bounding region and one of the second minimum bounding regions;
- selecting the shortest one of the distances; and
- in response to determining that the shortest one of the distances is greater than the threshold value, discarding the document by not including the document in a search result identified in response to the search query.

6. A method, comprising: by one or more computing devices,
- accessing a search query and a document identified in response to the search query;
- determining a probability that the search query has a local intent relating to a first geographical location;
- wherein in response to the probability meeting or exceeding a threshold probability value:
  - computing a threshold location value for the first geographical location based on a combination of the probability and a population density of the first geographical location;
  - constructing a first location feature for the search query based on the first geographical location and a location hierarchy, wherein the first location feature comprises the first geographical location;
  - extracting one or more second geographical locations from the document;
  - constructing a second location feature for the document based on the one or more second geographical locations and the location hierarchy, wherein the second location feature comprises one or more of the one or more second geographical locations;
  - comparing the first location feature and the second location feature and with respect to the threshold location value; and
  - in response to determining that there is no match between any geographical location of the first location feature and the one or more of the one or more geographical locations of the second location feature, discarding the document by not including the document in a search result identified in response to the search query.

7. The method recited in claim 6, wherein:
- the location hierarchy comprises one or more geographical locations at one or more levels and along one or more branches;
- one or more of the geographical locations are at individual levels;
- one or more of the geographical locations form individual branches from the first level to a last level of the branch; and
- individual ones of the geographical locations, except one of the geographical locations at the first level, have a parent geographical location within which the geographical location is located.

8. The method recited in claim 7, wherein:
- the first location feature further comprises zero or more third geographical locations, wherein individual ones of the third geographical locations enclose the first geographical location and is at a level above the level of the first geographical location and on the same branch as the first geographical location in the location hierarchy;
- individual ones of the one or more second geographical locations in the second location feature do not enclose any other one of the second geographical locations extracted from the document in the location hierarchy; and
- comparing the first location feature and the second location feature comprises comparing the first geographical location and the third geographical locations in the first location feature and the second geographical locations in the second location feature.

9. The method recited in claim 7, wherein:
- the first location feature further comprises:
  - the level of the first geographical location in the location hierarchy;
  - zero or more third geographical locations, wherein individual ones of the third geographical locations are on the same branch as the first geographical location and at a level above the level of the first geographical location in the location hierarchy; and
  - the level of individual ones of the third geographical locations in the location hierarchy;
- the second location feature further comprises:
  - all of the one or more second geographical locations extracted from the document;
  - the level of individual ones of the one or more second geographical locations; and
  - zero or more fourth geographical locations, wherein individual ones of the fourth geographical locations are on the same branch as one of the one or more second geographical locations and at a level above the level of the one of the second geographical locations in the location hierarchy; and
- comparing the first location feature and the second location feature comprises comparing the first geographical location and the third geographical locations in the first location feature and the second geographical locations and the fourth geographical locations in the second location feature, wherein one of the geographical locations in the first location feature and one of the geographical locations in the second location feature are compared in response to determining that the two geographical locations are at substantially the same level in the location hierarchy.

10. The method recited in claim 9, wherein:
- the first location feature further comprises one or more null locations, wherein in response to determining that there is any level below the level of the first geographical location on the branch of the first geographical location in the location hierarchy, the levels below the level of the first geographical location on the branch of the first geographical location has a null location in the first location feature; and the second location feature further comprises one or more null locations, wherein in response to determining that there is any level below the level of any one of the second geographical locations on the branch of the one or more of the one or more second geographical locations in the location hierarchy, the levels below the level of the one of the geographical locations on the branch of the one of the geographical locations has a null location in the first location feature.

11. A system, comprising:
a memory comprising instructions executable by one or more processors; and
one or more processors coupled to the memory to execute the instructions, the instructions being operable to:
access a search query and a document identified in response to the search query;
determine a probability that the search query has a local intent relating to a first geographical location;
wherein in response to the probability meeting or exceeding a threshold probability value, the instructions being further operable to:
determine a first minimum bounding region enclosing the first geographical location;
compute a threshold location value for the first geographical location based on a combination of the probability and a population density of the first geographical location;
extract one or more second geographical locations from the document;
for one or more of the one or more second geographical locations,
determine a second minimum bounding region enclosing the one or more second geographical locations;
compute a distance between the first minimum bounding region and the second minimum bounding region; and
in response to determining that the distance is greater than the threshold location value, the instructions being further operable to discard the document by not including the document in a search result identified in response to the search query.

12. The system recited in claim 11, wherein the one or more processors are further operable to execute the instructions to:
compute a normalized population density of the first geographical location based on a population density of the first geographical location and a population density of a country in which the first geographical location is located.

13. The system recited in claim 12, wherein the threshold location value for the first geographical location is operable to be computed based on a predetermined threshold, the probability that the search query has the local intent relating to the first geographical location, and the normalized population density of the first geographical location.

14. The system recited in claim 11, wherein:
the first minimum bounding region comprises a first minimum bounding rectangle;
the second minimum bounding region comprises a second minimum bounding rectangle; and to compute the distance between the first minimum bounding rectangle and the second minimum bounding rectangle comprises:
to determine whether the first minimum bounding rectangle and the second minimum bounding rectangle overlap;
in response to a determination that the first minimum bounding rectangle and the second minimum bounding rectangle overlap, set the distance to 0; and
in response to a determination that the first minimum bounding rectangle and the second minimum bounding rectangle do not overlap, set the distance to the shortest distance between any one of four vertices of the first minimum bounding rectangle and any one of four vertices of the second minimum bounding rectangle.

15. The system recited in claim 11, wherein the one or more processors are further operable to execute the instructions to:
determine one or more second minimum bounding regions enclosing the second geographical locations, wherein individual ones of the second minimum bounding regions enclose one of the second geographical locations;
compute one or more distances between the first minimum bounding region and the second minimum bounding regions, wherein individual ones of the distances are between first minimum bounding region and one of the second minimum bounding regions;
select the shortest one of the distances; and
in response to a determination that the shortest one of the distances is greater than the threshold, discard the document by not including the document in a search result identified in response to the search query.

16. A system, comprising:
a memory comprising instructions executable by one or more processors; and
one or more processors coupled to the memory and operable to execute the instructions, the one or more processors being operable when executing the instructions to:
access a search query and a document identified in response to the search query;
determine a probability that the search query has a local intent relating to a first geographical location;
wherein in response to the probability meeting or exceeding a threshold probability value, the instructions being further operable to:
construct a first location feature for the search query based on the first geographical location and a location hierarchy, wherein the first location feature comprises the first geographical location;
extract one or more second geographical locations from the document;
construct a second location feature for the document based on the one or more second geographical locations and the location hierarchy, wherein the second location feature comprises one or more of the one or more second geographical locations;
compute a threshold location value for the first geographical location based on a combination of the probability and a population density of the first geographical location;
compare the first location feature and the second location feature and with respect to the threshold location value; and
in response to determining there is no match between any geographical location of the first location feature and the one or more of the one or more second geographical locations of the second location feature, discard the document by not including the document in a search result identified in response to the search query.

17. The system recited in claim 16, wherein:
the location hierarchy comprises one or more geographical locations at one or more levels and along one or more branches;
one or more of the geographical locations are at the one or more levels;
one or more of the geographical locations form individual branches from a first level to a last level of the branch; and
the geographical locations, except one of the geographical locations at the first level, have a parent geographical location within which the geographical location is located.

18. The system recited in claim 17, wherein:
the first location feature further comprises zero or more third geographical locations, wherein individual ones of the third geographical locations encloses the first geographical location and is at a level above the level of the first geographical location and on the same branch as the first geographical location in the location hierarchy;
individual ones of the one or more second geographical locations in the second location feature do not enclose any other one of the second geographical locations extracted from the document in the location hierarchy; and
to compare the first location feature and the second location feature comprises a comparison of the first geographical location and the one or more third geographical locations in the first location feature and the one or more second geographical locations in the second location feature.

19. The system recited in claim 17, wherein:
the first location feature further comprises:
   a level of the first geographical location in the location hierarchy;
   zero or more third geographical locations, wherein individual ones of the third geographical locations are on the same branch as the first geographical location and at a level above the level of the first geographical location in the location hierarchy; and
   the level of individual ones of the third geographical locations in the location hierarchy;
the second location feature further comprises:
   the one or more second geographical locations extracted from the document;
   the level of individual ones of the one or more second geographical locations; and
   zero or more fourth geographical locations, wherein individual ones of the fourth geographical locations are on the same branch as one or more of the one or more second geographical locations and at a level above the level of the one or more of the one or more of the second geographical locations in the location hierarchy; and
to compare the first location feature and the second location feature comprises a comparison of the first geographical location and the third geographical locations in the first location feature and the second geographical locations and the fourth geographical locations in the second location feature, wherein one of the geographical locations in the first location feature and one of the geographical locations in the second location feature are compared only when the two geographical locations are at the same level in the location hierarchy.

20. The system recited in claim 19, wherein:
the first location feature further comprises one or more null locations, wherein in response to determining that there is any level below the level of the first geographical location on the branch of the first geographical location in the location hierarchy, individual ones of the levels below the level of the first geographical location on the branch of the first geographical location have a null location in the first location feature; and
the second location feature further comprises one or more null locations, wherein in response to determining that there is any level below the level of any one of the one or more second geographical locations on the branch of the one of the second geographical locations in the location hierarchy, individual ones of the levels below the level of the one of the geographical locations on the branch of the one of the geographical locations have a null location in the first location feature.

21. One or more computer-readable non-transitory storage media embodying software executable by one or more computer systems to:
access a search query and a document identified in response to the search query;
determine a probability that the search query has a local intent relating to a first geographical location;
wherein in response to the probability meeting or exceeding a threshold probability value:
   determine a first minimum bounding region enclosing the first geographical location;
   compute a threshold location value for the first geographical based on a combination of the probability and a population density of the first geographical location;
   extract one or more second geographical locations from the document;
   for one or more of the one or more second geographical locations,
      determine a second minimum bounding region enclosing the one or more of the one or more second geographical locations;
      compute a distance between the first minimum bounding region and the second minimum bounding region; and
      in response to determining that the distance is greater than the threshold, discard the document by not including the document in a search result identified in response to the search query.

22. The media recited in claim 21, wherein the software is further operable when executed by one or more computer systems to:
compute a normalized population density of the first geographical location based on the population density of the first geographical location and a country population density of a country in which the first geographical location is located.

23. The media recited in claim 22, wherein the threshold location value for the first geographical location is operable to be computed based on a predetermined threshold, the probability that the search query has a local intent relating to the first geographical location, and the normalized population density of the first geographical location.

24. The media recited in claim 21, wherein:
the first minimum bounding region comprises a first minimum bounding rectangle;

the second minimum bounding region comprises a second minimum bounding rectangle; and to compute the distance between the first minimum bounding rectangle and the second minimum bounding rectangle comprises:
  determine whether the first minimum bounding rectangle and the second minimum bounding rectangle overlap;
  in response to determining that the first minimum bounding rectangle and the second minimum bounding rectangle overlap, set the distance to 0; and
  in response to determining that the first minimum bounding rectangle and the second minimum bounding rectangle do not overlap, set the distance to the shortest distance between any one of four vertices of the first minimum bounding rectangle and any one of four vertices of the second minimum bounding rectangle.

25. The media recited in claim 21, wherein the software is further operable when executed by one or more computer systems to:
  determine one or more second minimum bounding regions enclosing the second geographical locations, wherein individual ones of the second minimum bounding regions enclose one or more of the one or more second geographical locations;
  compute one or more distances between the first minimum bounding region and the second minimum bounding regions, wherein individual ones of the distances are between first minimum bounding region and one of the second minimum bounding regions;
  select the shortest one of the distances; and
  in response to determining that the shortest one of the distances is greater than the threshold, discard the document by not including the document in a search result identified in response to the search query.

26. One or more computer-readable non-transitory storage media embodying software executable by one or more computer systems to:
  access a search query and a document identified in response to the search query;
  determine a probability that the search query has a local intent relating to a first geographical location;
  wherein in response to the probability meeting or exceeding a threshold probability value, the instructions are further operable to:
    construct a first location feature for the search query based on the first geographical location and a location hierarchy, wherein the first location feature comprises the first geographical location;
    extract one or more second geographical locations from the document;
    construct a second location feature for the document based on the one or more second geographical locations and the location hierarchy, wherein the second location feature comprises one or more of the one or more second geographical locations;
    compute a threshold location value for the first geographical location based on a combination of the probability and a population density of the first geographical location;
    compare the first location feature and the second location feature and with respect to the threshold value; and
    in response to determining that there is no match between any geographical location of the first location feature and any geographical location of the second location feature, discard the document by not including the document in a search result identified in response to the search query.

27. The media recited in claim 26, wherein:
the location hierarchy comprises one or more geographical locations at one or more levels and along one or more branches;
one or more of the geographical locations are at one or more levels;
one or more of the geographical locations form individual branches from the first level to a last level of the branch; and
individual ones of the geographical locations, except one of the geographical locations at the first level, have a parent geographical location within which the geographical location is located.

28. The media recited in claim 27, wherein:
the first location feature further comprises zero or more third geographical locations, wherein individual ones of the third geographical locations enclose the first geographical location and is at a level above the level of the first geographical location and on the same branch as the first geographical location in the location hierarchy;
individual ones of the one or more second geographical locations in the second location feature does not enclose any other one of the one or more second geographical locations extracted from the document in the location hierarchy; and
to compare the first location feature and the second location feature comprises compare the first geographical location and the third geographical locations in the first location feature and the one or more second geographical locations in the second location feature.

29. The media recited in claim 27, wherein:
the first location feature further comprises:
  the level of the first geographical location in the location hierarchy;
  zero or more third geographical locations, wherein individual ones of the third geographical locations are on the same branch as the first geographical location and at a level above the level of the first geographical location in the location hierarchy; and
  the level of individual ones of the third geographical locations in the location hierarchy;
the second location feature further comprises:
  the one or more second geographical locations extracted from the document;
  the level of individual ones of the one or more second geographical locations; and
  zero or more fourth geographical locations, wherein individual ones of the fourth geographical locations are on the same branch as one or more of the one or more second geographical locations and at a level above the level of the one or more of the one or more second geographical locations in the location hierarchy; and
to compare the first location feature and the second location feature comprises to compare the first geographical location and the third geographical locations in the first location feature and the second geographical locations and the fourth geographical locations in the second location feature, wherein one of the geographical locations in the first location feature and one of the geographical locations in the second location feature are compared only when the two geographical locations are at the same level in the location hierarchy.

30. The media recited in claim 29, wherein:
- the first location feature further comprises one or more null locations, wherein in response to determining that there is any level below the level of the first geographical location on the branch of the first geographical location in the location hierarchy, levels below the level of the first geographical location on the branch of the first geographical location have a null location in the first location feature; and
- the second location feature further comprises one or more null locations, wherein in response to determining that there is any level below the level of any one of the second geographical locations on the branch of the one of the second geographical locations in the location hierarchy, the levels below the level of the one of the geographical locations on the branch of the one of the geographical locations have a null location in the first location feature.

31. The method recited in claim 1, further comprising determining a value of the normalized population based on a population density of the first geographical location.

* * * * *